March 1, 1927.

F. W. ADLOF 1,619,780

CIRCULAR SAW

Filed Feb. 19, 1926   2 Sheets-Sheet 1

WITNESSES
H. T. Walker
Franklin J. Foster

INVENTOR
F. W. Adlof
BY
ATTORNEYS

March 1, 1927.

F. W. ADLOF 1,619,780

CIRCULAR SAW

Filed Feb. 19, 1926

WITNESSES
H. J. Walker
Franklin J. Foster

INVENTOR
F. W. Adlof
BY
ATTORNEYS

Patented Mar. 1, 1927.

1,619,780

UNITED STATES PATENT OFFICE.

FREDERICK W. ADLOF, OF NEW BRIGHTON, PENNSYLVANIA.

CIRCULAR SAW.

Application filed February 19, 1926. Serial No. 89,390.

The tool of the present invention is in the nature of a manually operated disc saw which is capable of a wide range of utility, but which is peculiarly suited for cutting out sections of flooring, partitions, ceilings etc., for the purpose of installing electrical wiring, piping connections or similar apparatus.

An object of the invention is to provide a tool for cutting out smaller sections of flooring or the like with expedition, and in such a manner that the wooden floors or partitions are not seriously damaged by the sawing operation.

Further objects of the invention are to provide a tool of this general character which may be conveniently manipulated even in relatively inaccessible corners, a tool of simple, practical construction which will be rugged and durable in use, and which may be manufactured with comparative economy.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Figures 1, 2:
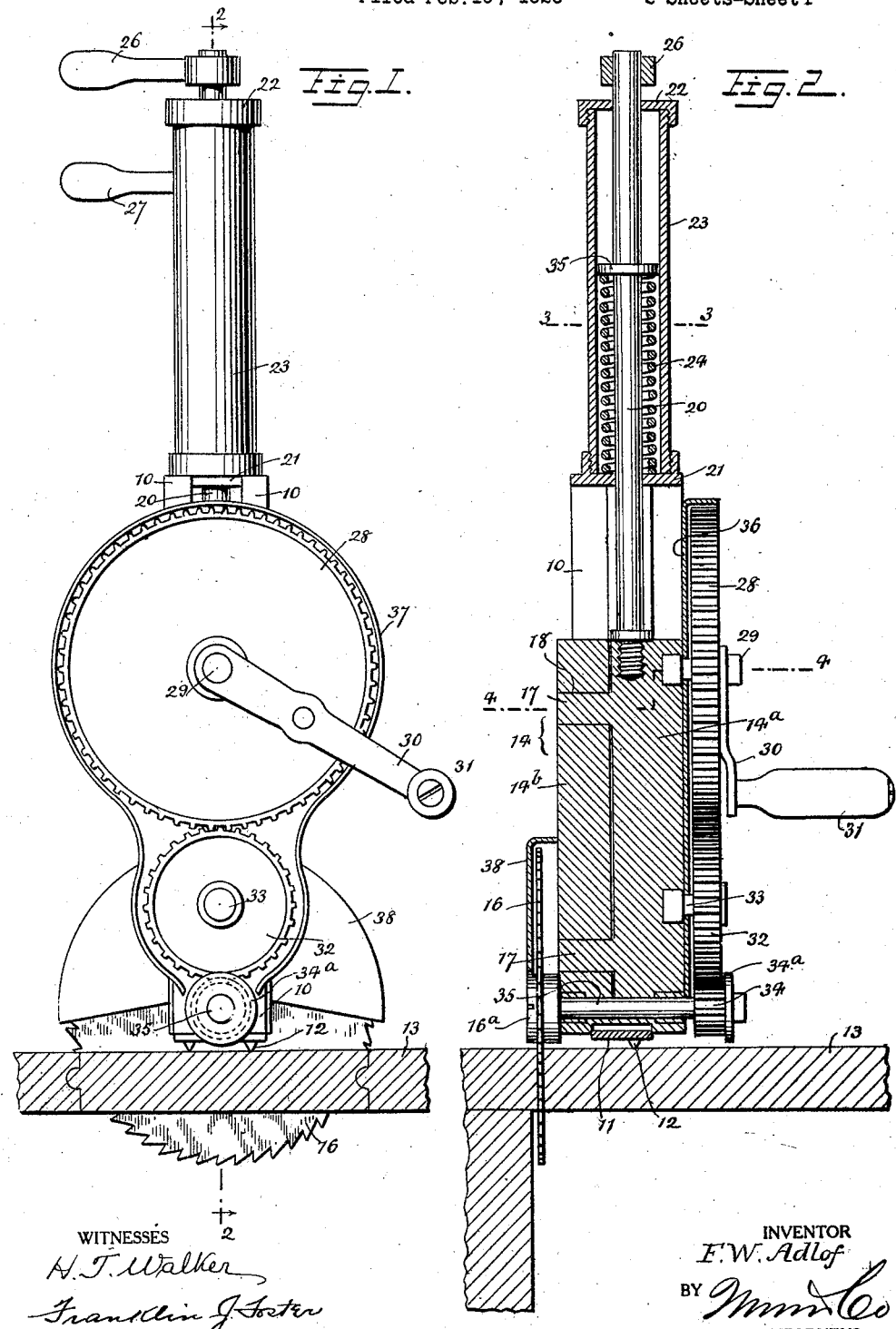
Fig. 1 is a view in side elevation of a tool embodying the invention, showing the device in operative relationship to a floor to be worked upon.
Fig. 2 is a longitudinal sectional view through the tool on the line 2—2 of Fig. 1.
Figure 3:
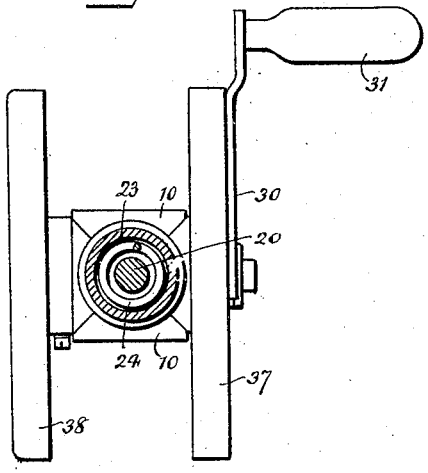
Fig. 3 is a transverse sectional view on the line 3—3 of Fig. 2.
Figure 4:
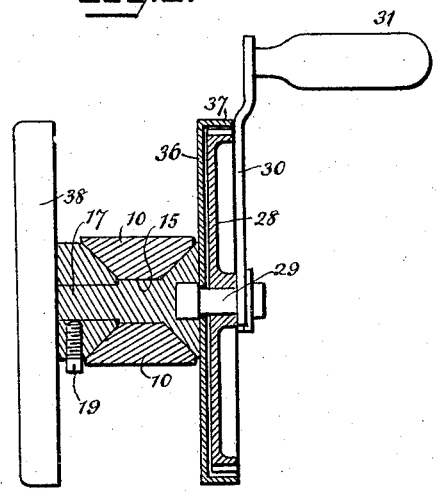
Fig. 4 is a transverse sectional view on the staggered line 4—4 of Fig. 2.

In the drawings I have used the reference characters 10, 10 to designate a pair of vertical guiding uprights rising from a base plate 11. Spurs or teeth 12 on the under face of the base plate are adapted to engage in a floor or partition 13 to prevent slipping of the frame when starting operation of the tool. The cross sectional shape of the uprights may be best seen in Fig. 4, wherein it will be noted that they include opposed flat faces and bevelled side faces. A carriage 14 vertically slidable in the guiding standards 10 is grooved at 15 to fit the standards. The carriage 14 is preferably formed of a pair of complementary blocks 14ª and 14ᵇ. Block 14ª preferably carries the operating mechanism for the disc saw 16 carried by the block 14ᵇ. Block 14ª preferably includes extensions 17 passed through openings 18 in the block 14ᵇ, and set screws 19 are used to retain the two blocks in assembled relationship.

Means is provided for normally holding the carriage 14 in elevated position to retain the saw 16 out of contact with the supporting surface 13 upon which the base plate 11 of the frame rests. One simple mechanism for accomplishing this result has been indicated, and includes a guide rod 20 having bearings in the transverse head 21 of the carriage guide and frame, and in a cap 22 screwed on to a vertical tubular spring housing 23 which is mounted on the member 21. A coiled expansion spring 24 disposed within the housing, encircles the guide rod 20, bears at one end against the member 21, and at its other end against a collar 35 on the rod. This spring tends to retain the carriage 14 in elevated position, and a handle 26 on the upper end of the rod 20 is provided for effecting manual depression of the carriage against the action of the spring, thereby moving the saw into engagement with the work. An additional stationary handle member 27 is also provided on the tubular spring housing 23, and when the carriage has been manually depressed for a short distance, the handle 26 will approach close enough to the handle 27 for the operator to grasp both handles with one hand, for a purpose to be later described.

Obviously the mechanism for manually driving the disc saw 16 is subject to considerable variation, but I have shown one convenient form of mechanism which includes a driving gear 28 journalled on a stud 29 which projects from the face of the block 14ª. An operating crank arm 30 for the gear wheel 28 carries a handle 31 which may be manually grasped and turned. Below the gear wheel 28 and meshing therewith is a speed increasing gear 32 journalled on a stud 33. Gear 32 meshes with a pinion 34 on one end of a transverse shaft 35 extending through the lower end of the carriage and bearing at its opposite end the disc saw 16. It will be apparent that relatively slow rotation of the driving gear 28 will effect rapid rotation of the saw. Preferably the gear wheels 28, 32, 34 are protected by a guard plate 36, the flanged peripheral edges 37 of which project outwardly over the gears. The saw 16 is also protected by guard plate 38 of approximately semi-circular shape which is slightly spaced from the carriage block 14$^b$ and defines a housing in which the upper half of the disc saw turns.

The pinion 34 is faced with a disc 34$^a$ of larger diameter than the pinion, and the saw 16 is provided with a hub 16$^a$, the same diameter as the disc 34$^a$.

By virtue of this construction, the disc 34$^a$ and hub 16$^a$ will engage the floor 13 before the carriage 14 engages the base 12 of the carriage frame. When this occurs, handles 26 and 27 will be relatively close together, and they may be manually grasped to elevate the guide frame 10, and lift the teeth 12 out of engagement with the floor, the tool then resting upn the disc 34$^a$ and hub 16$^a$ which will serve as traction means for shifting the tool along the floor and causing the saw to cut a notch of any desired length.

The operation of the device will be evident from the foregoing description. Carriage 14$^a$ with the saw and saw operating gears is ordinarily retained at the upper end of its guide frame by the spring 24. When the tool is to be used however, the handle 26 affords means for manually depressing the carriage 14 and feeding the saw into the work at the proper rate which is predetermined by the speed of rotation of the manually operated driving gear 28.

The manner in which the two handles may be manually grasped to disengage the teeth 12 from the floor and permit the tool to be shifted along on the disc 34$^a$ and hub 16$^a$ of the saw, has been previously described.

Various changes and alterations might be made in the general form and arrangement of parts described without departing from the invention. Hence I do not wish to limit myself to the details set forth, but shall consider myself at liberty to make such changes and alterations as fairly fall within the spirit and scope of the appended claims.

I claim:

1. In a tool of the class described, a guide frame having teeth at one end thereof engageable with the surface of the material to be sawed, a saw carriage slidable in the guide frame, and normally spring retracted to retain the saw out of engagement with the work, a transverse shaft mounted in the carriage, and a disc saw carried by the shaft, traction means at the ends of the shaft adapted to engage the surface of the work before the carriage engages the end of its guideway, and means permitting retraction of the guide frame to disengage the teeth, whereby the tool may travel on the traction means.

2. It a tool of the class described, a guide frame having teeth at one end thereof engageable with the surface of the material to be sawed, a saw carriage slidable in the guide frame, and normally spring retracted to retain the saw out of engagement with the work, a transverse shaft mounted in the carriage, and a disc saw carried by the shaft, traction means at the ends of the shaft adapted to engage the surface of the work before the carriage engages the end of its guideway, and means permitting retraction of the guide frame to disengage the teeth, whereby the tool may travel on the traction means, said means including handles rigid with the guide frame and with the carriage respectively adapted to be manually grasped and advanced toward each other to effect disengagement of the teeth.

FREDERICK W. ADLOF.